United States Patent
Shiraishi et al.

(10) Patent No.: US 9,083,224 B2
(45) Date of Patent: Jul. 14, 2015

(54) METHOD OF MANUFACTURING DISK DRIVE APPARATUS

(71) Applicant: Nidec Corporation, Kyoto (JP)

(72) Inventors: Masahiro Shiraishi, Kyoto (JP); Kazuhiro Sato, Kyoto (JP); Tsuyoshi Morita, Kyoto (JP)

(73) Assignee: Nidec Corporation, Kyoto (JP)

( * ) Notice: Subject to any disclaimer, the term of this patent is extended or adjusted under 35 U.S.C. 154(b) by 236 days.

(21) Appl. No.: 13/804,792

(22) Filed: Mar. 14, 2013

(65) Prior Publication Data

US 2014/0082927 A1    Mar. 27, 2014

Related U.S. Application Data

(60) Provisional application No. 61/703,840, filed on Sep. 21, 2012.

(51) Int. Cl.
*H02K 15/02* (2006.01)
*H02K 15/10* (2006.01)
*G11B 19/20* (2006.01)

(52) U.S. Cl.
CPC ............ *H02K 15/02* (2013.01); *G11B 19/2009* (2013.01); *Y10T 29/49012* (2015.01)

(58) Field of Classification Search
CPC ........... G11B 17/0287; G11B 19/2009; G11B 25/043; G11B 19/2045; G11B 5/82; Y10T 29/49025; Y10T 29/49012; Y10T 29/49945; Y10T 29/49963; F16C 2370/12
USPC ........... 29/598, 428, 445, 453, 525.11, 592.1, 29/596; 360/98.8, 99, 8, 99.12
See application file for complete search history.

(56) References Cited

U.S. PATENT DOCUMENTS 6,366,427 B1 *  4/2002  West ........................ 360/99.12
7,589,935 B2 *  9/2009  Kim ......................... 360/99.12

FOREIGN PATENT DOCUMENTS

JP      2001-035129 A      2/2001

OTHER PUBLICATIONS

Shiraishi et al., "Spindle Motor and disk drive apparatus"; U.S. Appl. No. 13/804,855, filed Mar. 14, 2013.

* cited by examiner

*Primary Examiner* — Thiem Phan
(74) *Attorney, Agent, or Firm* — Keating & Bennett, LLP

(57) ABSTRACT

A disk drive apparatus includes a rotor hub including an outer surface with a hub screw groove and a hub information mark indicative of a start position of the hub screw groove. A method of manufacturing the disk drive apparatus includes the steps of preparing a spindle motor including the rotor hub, preparing a clamper including a clamper screw groove, and fitting a recording disk to the spindle motor. The method further includes the steps of detecting a position of the hub information mark and, based on the detected position of the hub information mark, positioning each of the clamper and the spindle motor in a circumferential direction, and screwing the clamper to the spindle motor.

13 Claims, 12 Drawing Sheets

METHOD OF MANUFACTURING DISK DRIVE APPARATUS

BACKGROUND OF THE INVENTION

1. Field of the Invention

The present invention relates to a method of manufacturing a disk drive apparatus, and a method of manufacturing a spindle motor.

2. Description of the Related Art

A spindle motor arranged to rotate a disk is installed in a disk drive apparatus. A known spindle motor and a known disk drive apparatus are described, for example, in JP-A 2001-35129. In the disk drive apparatus described in JP-A 2001-35129, a disk is adhered to a spacer including an inner circumferential portion with a screw groove defined therein, and this spacer is screwed to an outer circumferential portion of a hub, the outer circumferential portion including a screw groove defined therein, whereby the disk is fixed to the hub (see, for example, paragraph [0014] of JP-A 2001-35129).

In the case of the disk drive apparatus described in JP-A 2001-35129, when the spacer is screwed to the hub, the hub and the spacer are rotated relative to each other until the hub and the spacer are engaged with each other. In this case, the hub and the spacer are rotated relative to each other while being in contact with each other, and this may result in generation of a particle. The particle generated may become attached to the disk, thereby contaminating the disk.

SUMMARY OF THE INVENTION

A first preferred embodiment of the present invention is directed to a method of manufacturing a disk drive apparatus including a spindle motor including a rotor hub including an outer surface with a hub screw groove and a hub information mark indicative of a start position of the hub screw groove. The method includes the steps of: preparing the spindle motor; preparing a clamper including a clamper screw groove in an inner circumferential portion thereof; fitting a recording disk to the spindle motor; detecting a position of the hub information mark; and, based on the detected position of the hub information mark, positioning each of the clamper and the spindle motor in a circumferential direction, and screwing the clamper to the spindle motor. The rotor hub is arranged to rotate about a central axis.

According to the first preferred embodiment of the present invention, it is possible to identify the start position of the hub screw groove by detecting the position of the hub information mark. This makes it possible to efficiently screw the clamper to the rotor hub, and eliminates a need to attempt to physically find where the hub and the clamper are engaged with each other before the screwing so as to significantly reduce and prevent generation of undesirable particles.

A second preferred embodiment of the present invention is directed to a method of manufacturing a disk drive apparatus including a spindle motor including a rotor hub including an outer surface with a hub screw groove and a hub information mark indicative of a start position of the hub screw groove. The method includes the steps of: preparing the spindle motor; preparing a clamper including a clamper screw groove in an inner circumferential portion thereof; fitting a recording disk to the spindle motor; referring to information regarding a positional relationship between the start position of the hub screw groove and the hub information mark; and, based on the information referred to, positioning each of the clamper and the spindle motor in a circumferential direction, and screwing the clamper to the spindle motor. The rotor hub is arranged to rotate about a central axis.

According to the second preferred embodiment of the present invention, it is possible to identify the start position of the hub screw groove by detecting the position of the hub information mark. This makes it possible to efficiently screw the clamper to the rotor hub, and eliminates a need to attempt to physically find where the hub and the clamper are engaged with each other before the screwing, resulting in a reduction in the generation of undesirable particles. In particular, a change in the positional relationship between the start position of the hub screw groove and the hub information mark does not cause a problem because the information regarding the positional relationship between the start position of the hub screw groove and the hub information mark is referred to as necessary.

A third preferred embodiment of the present invention is directed to a method of manufacturing a spindle motor including a rotor hub on which a recording disk is mounted. The method includes the steps of: a) defining an intermediate workpiece while rotating an initial workpiece to be processed about a central axis; b) defining a hub information mark in an outer surface of the intermediate workpiece; c) after step b), subjecting the intermediate workpiece to cutting to define the rotor hub; d) after step b), defining a hub screw groove in an outer surface of the rotor hub by cutting such that the hub screw groove starts at a position radially overlapping with the hub information mark, or at a position circumferentially displaced from the hub information mark by a predetermined angle; and e) after step c), fitting together a rotating portion including the rotor hub and a stationary portion arranged to be stationary with respect to the rotating portion.

The third preferred embodiment of the present invention makes it possible to manufacture the spindle motor with the start position of the hub screw groove being identifiable based on the hub information mark.

A fourth preferred embodiment of the present invention is directed to a method of manufacturing a spindle motor including a rotor hub on which a recording disk is mounted. The method includes the steps of: a) defining the rotor hub while rotating an initial workpiece to be processed about a central axis; b) after step a), defining a hub screw groove in an outer surface of the rotor hub by cutting; c) after step b), fitting together a rotating portion including the rotor hub and a stationary portion arranged to be stationary with respect to the rotating portion; and d) after step c), defining a hub information mark at a start position of the hub screw groove, or at a position circumferentially displaced from the start position by a predetermined angle, in the outer surface of the rotor hub.

The fourth preferred embodiment of the present invention makes it possible to manufacture the spindle motor with the start position of the hub screw groove being identifiable based on the hub information mark.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a spindle motor is referred to by the term "axial direction", "axial", or "axially", that directions perpendicular or substantially perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that a vertical direction is the axial direction, and that a side on which a recording disk is arranged with respect to a base portion of the spindle motor is defined as an upper side. The shape of each member or portion and relative positions of different members or portions will be described based on the above assumptions. It should be noted, however, that the above definitions of the vertical direction and the upper and lower sides are not meant to restrict in any way the orientation of a spindle motor or a disk drive apparatus according to any preferred embodiment of the present invention when in use.

Also note that the term "parallel" as used herein includes both "parallel" and "substantially parallel" directions. Also note that the term "perpendicular" as used herein includes both "perpendicular" and "substantially perpendicular" directions.

Figure 1:
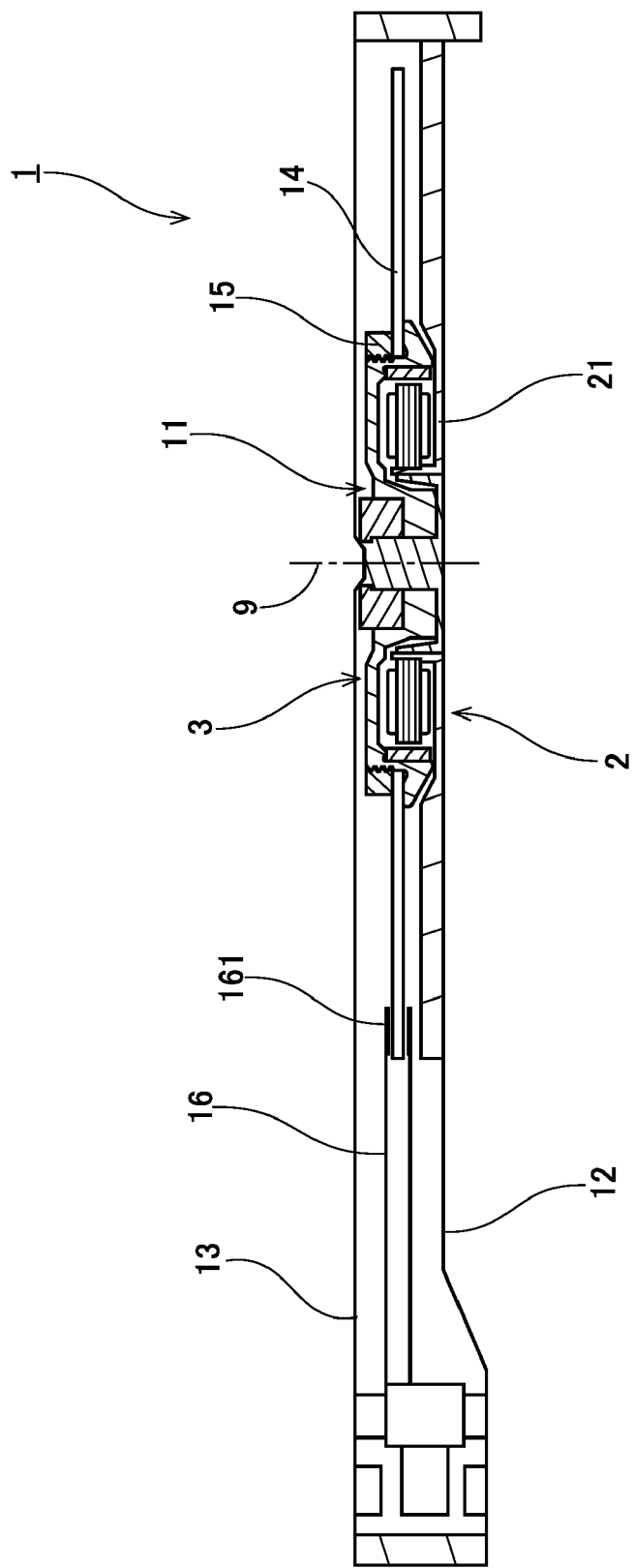
FIG. 1 is a vertical cross-sectional view of a disk drive apparatus according to a first preferred embodiment of the present invention.
Figure 2:
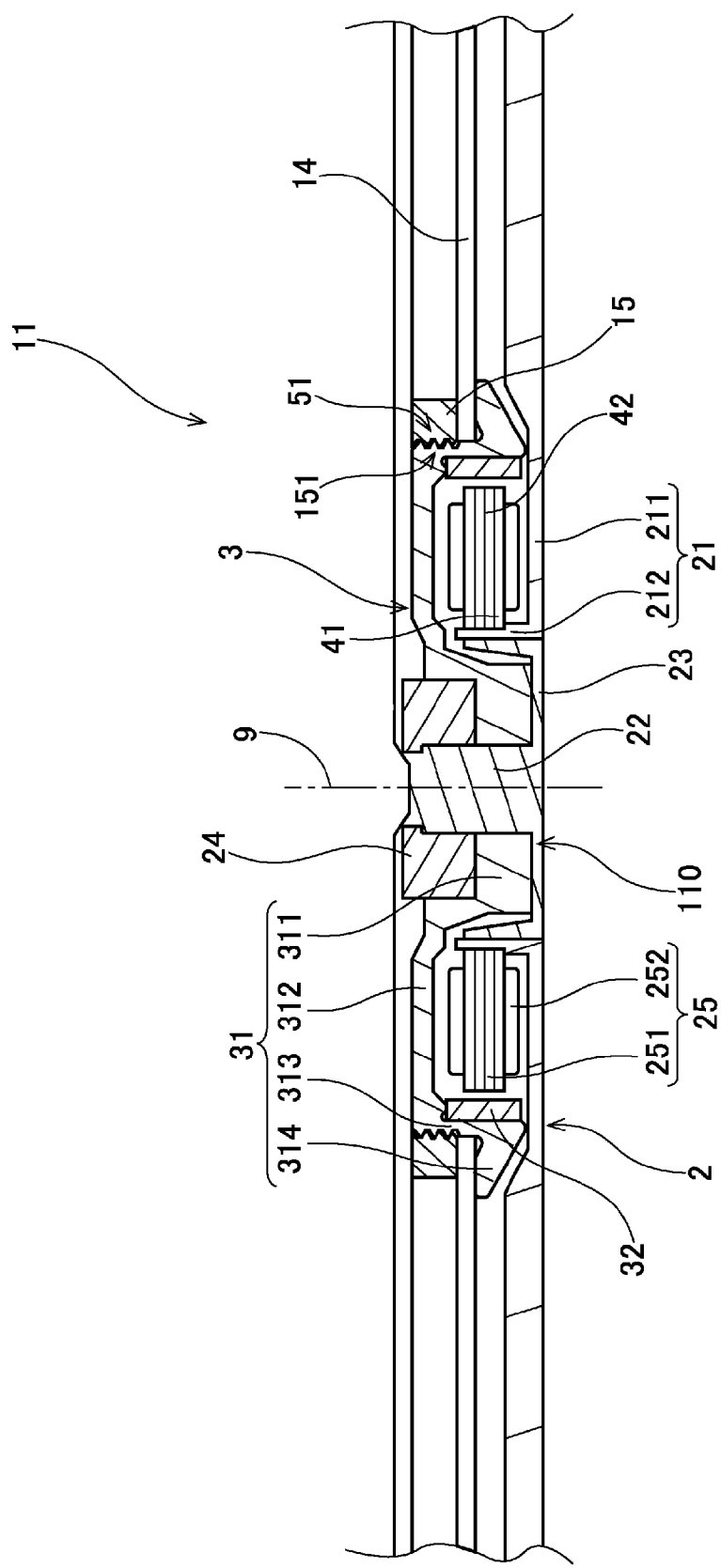
FIG. 2 is a partial vertical cross-sectional view of the disk drive apparatus according to the first preferred embodiment of the present invention.

FIG. 1 is a vertical cross-sectional view of a disk drive apparatus 1 according to a first preferred embodiment of the present invention. FIG. 2 is a partial vertical cross-sectional view of the disk drive apparatus 1. The disk drive apparatus 1 is an apparatus arranged to rotate a recording disk (hereinafter referred to simply as the "disk 14") and perform reading and/or writing of information from or to the disk 14. Referring to FIG. 1, the disk drive apparatus 1 preferably includes a spindle motor 11, an apparatus housing 12, a cover 13, the disk 14, a clamper 15, and an access portion 16.

The spindle motor 11 is arranged to rotate the disk 14 about a central axis 9 while supporting the disk 14. Referring to FIG. 2, the spindle motor 11 preferably includes a rotating portion 3 and a stationary portion 2 including a base portion 21. The base portion 21 is a portion of the apparatus housing 12, and is preferably defined integrally with a remaining portion of the apparatus housing 12.

The cover 13 is arranged to cover an upper opening of the apparatus housing 12.

The rotating portion 3 of the spindle motor 11, the disk 14, and the access portion 16 are accommodated in a case defined by the cover 13 and the apparatus housing 12, which includes the base portion 21.

The disk 14 is supported by the rotating portion 3 of the spindle motor 11. Once the spindle motor 11 is driven, the disk 14 is caused to rotate together with the rotating portion 3. The disk 14 is axially positioned by being held between a rotor hub 31 of the spindle motor 11 and the clamper 15. The rotor hub 31 will be described below.

The clamper 15 is a member arranged to fix the disk 14. The clamper 15 preferably includes an annular or substantially annular inner circumferential surface. Referring to FIG. 2, the inner circumferential surface of the clamper 15 preferably includes a clamper screw portion 151. Specifically, an inner circumferential portion of the clamper 15 includes clamper screw grooves. The clamper screw portion 151 of the clamper 15 and a hub screw portion 51 of the rotor hub 31, which will be described below, are preferably, for example, screwed to each other, so that the clamper 15 is fixed to the spindle motor 11.

The access portion 16 is arranged to move heads 161 along recording surfaces of the disk 14 and perform the reading and writing of information from or to the disk 14. Note that the access portion 16 may alternately be arranged to perform only one of the reading and writing of information from or to the disk 14, if so desired.

Also note that the number of disks 14 included in the disk drive apparatus 1 may alternatively be more than one.

Next, the structure of the above-described spindle motor 11 will now be described below.

Referring to FIG. 2, the spindle motor 11 includes the stationary portion 2, which is arranged to be stationary relative to the apparatus housing 12 of the disk drive apparatus 1, and the rotating portion 3, which is arranged to rotate about the central axis 9 while supporting the disk 14.

The stationary portion 2 preferably includes the base portion 21, a shaft 22, a lower annular portion 23, an upper annular portion 24, and a stator 25.

The base portion 21 is arranged to extend radially below the stator 25. As described above, the base portion 21 is a portion of the apparatus housing 12 of the disk drive apparatus 1 (see FIG. 1), and is preferably defined integrally with the remaining portion of the apparatus housing 12 as a single monolithic member. Note that the base portion 21 and the apparatus housing 12 may alternatively be defined by separate members if so desired. The base portion 21 includes a bottom plate portion 211 arranged to extend radially, and a substantially cylindrical holder portion 212 arranged to project upward from an inner edge of the bottom plate portion 211. The base portion 21 is preferably made of, for example, a metal such as an aluminum alloy.

The shaft 22 is arranged to extend along the central axis 9 extending in the vertical direction, and is substantially columnar in shape. The shaft 22 is made, for example, of a metal such as stainless steel. An upper end portion of the shaft 22 is fixed to the cover 13 of the disk drive apparatus 1. A lower end portion of the shaft 22 is fixed to the base portion 21 through the lower annular portion 23.

The lower annular portion 23 is an annular or substantially annular member arranged to surround the lower end portion of the shaft 22. The lower annular portion 23 is arranged to project radially outward from the lower end portion of the shaft 22. In the present preferred embodiment, the shaft and the lower annular portion are preferably defined integrally with each other as a single monolithic member. Note that the shaft 22 and the lower annular portion 23 may alternatively be defined by separate members. An outer circumferential surface of the lower annular portion 23 is fixed to an inner circumferential surface of the holder portion 212 of the base portion 21.

The upper annular portion 24 is an annular or substantially annular member fixed to an outer circumferential surface of the shaft 22. The upper annular portion 24 is arranged above the lower annular portion 23. An inner circumferential surface of the upper annular portion 24 is preferably fixed to the outer circumferential surface of the shaft 22 through, for example, press fitting, shrink fitting, adhesion, or by any other desirable fixing method. The upper annular portion 24 is preferably made, for example, of a metal including copper as a main component or a resin. Note that the shaft 22 and the upper annular portion 24 may be defined integrally with each other.

The stator 25 includes a stator core 251 and a plurality of coils 252. The stator core 51 is preferably defined by, for example, laminated steel sheets, that is, electromagnetic steel sheets, such as silicon steel sheets, placed one upon another in the axial direction. The stator core 251 preferably includes an annular or substantially annular core back 41 and a plurality of teeth 42 arranged to project radially outward from the core back 41. The core back 41 is fixed to an outer circumferential surface of the holder portion 212. Each coil 252 is preferably defined by a conducting wire wound around a separate one of the teeth 42.

The rotating portion 3 preferably includes the rotor hub 31 and a rotor magnet 32.

The rotor hub 31 is arranged to rotate about the central axis 9 around the shaft 22. The rotor hub 31 is preferably made of, for example, a metal such as ferromagnetic stainless steel. The rotor hub 31 preferably includes a sleeve portion 311, a hub circular plate portion 312, a hub cylindrical portion 313, and a disk mount portion 314. The sleeve portion 311 is preferably cylindrical or substantially cylindrical and centered on the central axis 9, and includes an inner circumferential surface arranged opposite to the outer circumferential surface of the shaft 22. The sleeve portion 311 is preferably arranged axially between the upper annular portion and the lower annular portion 23. The hub circular plate portion 312 is preferably arranged to extend radially outward from an upper end portion of the sleeve portion 311. The hub cylindrical portion 313 is arranged to extend axially downward from an outer circumferential portion of the hub circular plate portion 312. The disk mount portion 314 is arranged to extend radially outward from a lower end portion of the hub cylindrical portion 313.

Referring to FIG. 2, at least a portion of an outer circumferential surface of the hub cylindrical portion 313 is arranged to define a contact surface arranged to make contact with an inner circumferential portion of the disk 14. In addition, an upper surface of the disk mount portion 314 is preferably arranged to define a mounting surface arranged to have the disk 14 mounted thereon. The disk 14 is mounted on the upper surface of the disk mount portion 314. The clamper 15 is arranged on an upper side of the disk 14. Axial displacement of the disk 14 is thereby prevented. The inner circumferential portion of the disk 14 is arranged to be in contact with the outer circumferential surface of the hub cylindrical portion 313. The radial position of the disk 14 is thereby fixed. The hub cylindrical portion 313, the disk mount portion 314, and the clamper 15 are preferably arranged to thus together define a support portion to support the disk 14.

The rotor magnet 32 is fixed to an inner circumferential surface of the hub cylindrical portion 313 of the rotor hub 31. The rotor magnet 32 according to the present preferred embodiment is preferably annular and centered on the central axis 9. An inner circumferential surface of the rotor magnet 32 is arranged radially opposite an outer circumferential surface of each of the teeth 42 of the stator core 251. In addition, the inner circumferential surface of the rotor magnet 32 is a pole surface in which north and south poles are arranged alternately with each other.

Note that a plurality of magnets may alternatively be used in place of the annular rotor magnet 32, if so desired. In the case where the plurality of magnets are used, the magnets are arranged such that north and south poles alternate with each other in a circumferential direction.

The rotating portion 3 is rotatably supported by the stationary portion 2 through a bearing mechanism 110. The bearing mechanism 110 according to the present preferred embodiment is preferably a fluid bearing mechanism defined by the shaft 22, the lower annular portion 23, the upper annular portion 24, the sleeve portion 311 of the rotor hub 31, and a lubricating fluid arranged between the sleeve portion 311 and a combination of the shaft 22, the lower annular portion 23, and the upper annular portion 24. Note that a bearing of another type, such as, for example, a ball bearing, a plain bearing, or the like, may be used in place of the fluid bearing mechanism.

Once drive currents are supplied to the coils 252 in the spindle motor 11 described above, magnetic flux is generated around each of the teeth 42. Then, interaction between the magnetic flux of the teeth 42 and that of the rotor magnet 32 produces a circumferential torque between the stationary portion 2 and the rotating portion 3, so that the rotating portion 3 is caused to rotate about the central axis 9 with respect to the stationary portion 2. The recording disk 14 supported by the rotor hub 31 is caused to rotate about the central axis 9 together with the rotating portion 3.

Figure 3:
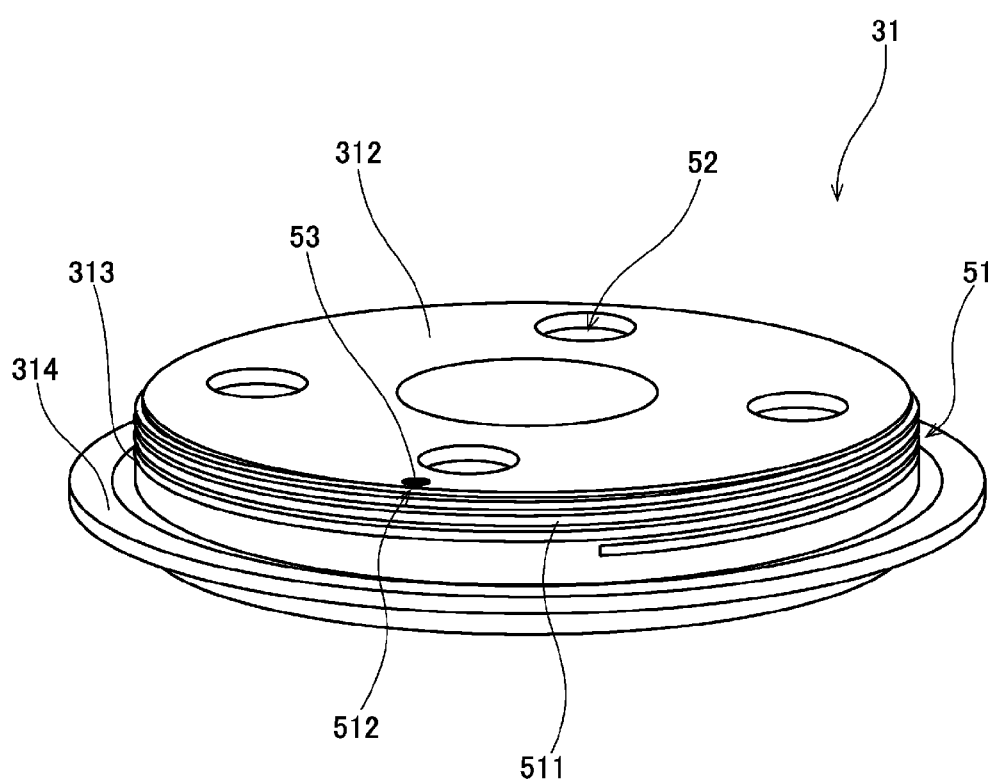
FIG. 3 is a perspective view of a rotor hub according to the first preferred embodiment of the present invention.
Figure 4:
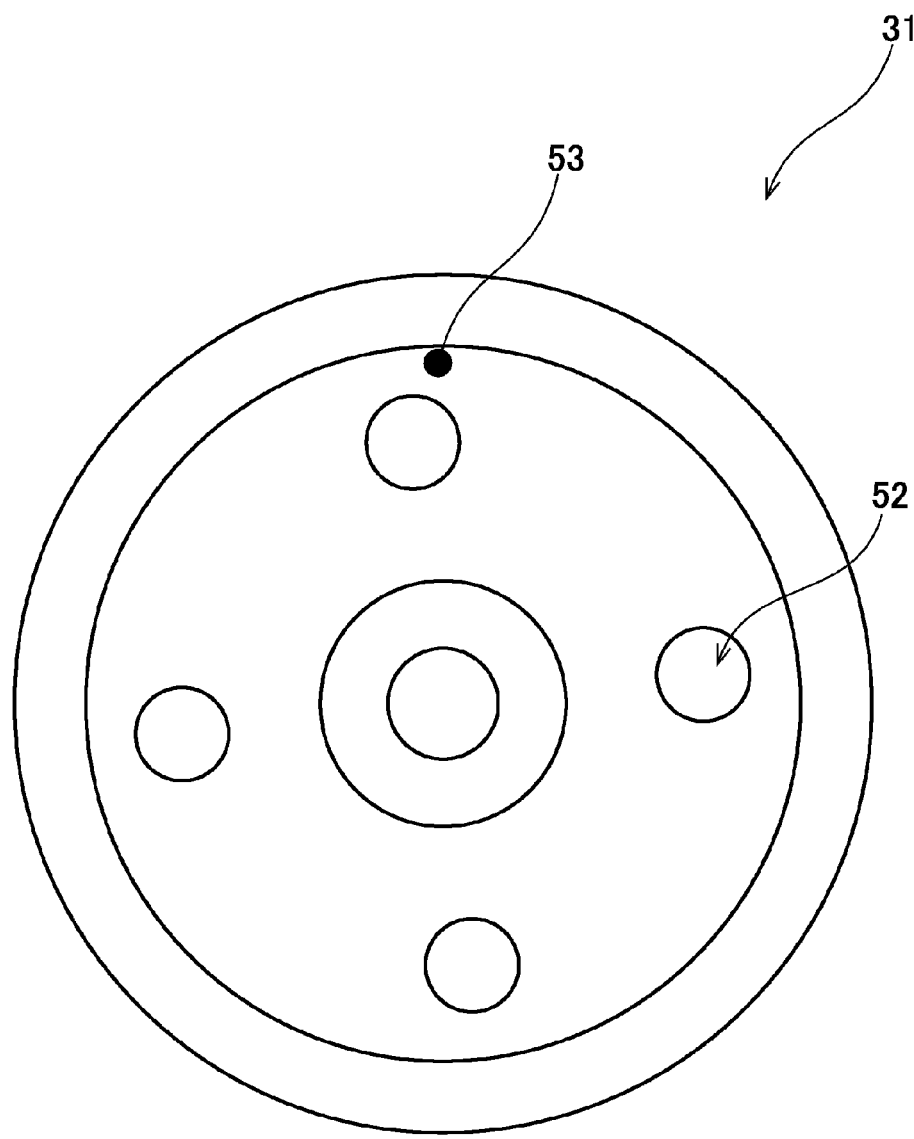
FIG. 4 is a top view of the rotor hub according to the first preferred embodiment of the present invention.

Next, a procedure for fitting the rotor hub 31 and the clamper 15 together in accordance with a preferred embodiment of the present invention will now be described below. FIG. 3 is a perspective view of the rotor hub 31. FIG. 4 is a top view of the rotor hub 31.

First, the structure of the rotor hub 31 will be described in more detail below.

Referring to FIG. 3, the outer circumferential surface of the hub cylindrical portion 313 includes the hub screw portion 51. Spiral hub screw grooves 511 are defined in the hub screw portion 51. Screw groove start positions 512 are arranged at an upper end of the hub screw portion 51. Each screw groove start position 512 refers to an upper start position of a separate one of the hub screw grooves 511. The hub screw portion according to the present preferred embodiment is preferably defined by, for example, a double-start thread, and the number of screw groove start positions 512 included in the hub screw portion 51 is therefore two. Note that the hub screw portion 51 may alternatively be defined by a single-start thread or a multi-start thread including three or more threads, if so desired. In the case where the hub screw portion 51 is defined by the single-start thread, the number of screw groove start positions 512 included in the hub screw portion 51 will be one. In the case where the hub screw portion 51 is defined by the multi-start thread including three or more threads, the number of screw groove start positions 512 included in the hub screw portion 51 will be equal to the number of threads included in the hub screw portion 51.

Moreover, referring to FIGS. 3 and 4, the hub circular plate portion 312 preferably includes jig receiving holes 52 and a hub information mark 53.

Each jig receiving hole 52 is recessed axially downward from an upper surface of the hub circular plate portion 312. The jig receiving hole 52 is a hole into which a portion of a jig used to fix the rotor hub 31 is inserted when the rotor hub 31 and the clamper 15 are fitted together. Note that, although the number of jig receiving holes 52 is preferably four in the present preferred embodiment, the number of jig receiving holes 52 may alternatively be zero, one, two, three, or more than four in other preferred embodiments of the present invention. Also note that each jig receiving hole is preferably arranged not to pass through the hub circular plate portion 312.

The hub information mark 53 indicates the positions of the screw groove start positions 512, which are the start positions of the hub screw grooves 511. The hub information mark 53 is arranged in the upper surface of the hub circular plate portion 312. Specifically, the hub information mark 53 is arranged radially outward of a radially outer end portion of each jig receiving hole 52. The hub information mark 53 is arranged at a position radially overlapping with one of the screw groove start positions 512. That is, on an outer surface of the rotor hub 31, the hub information mark 53 and the screw groove start position 512 are arranged to overlap with each other in a radial direction with respect to the central axis 9.

Figure 5:
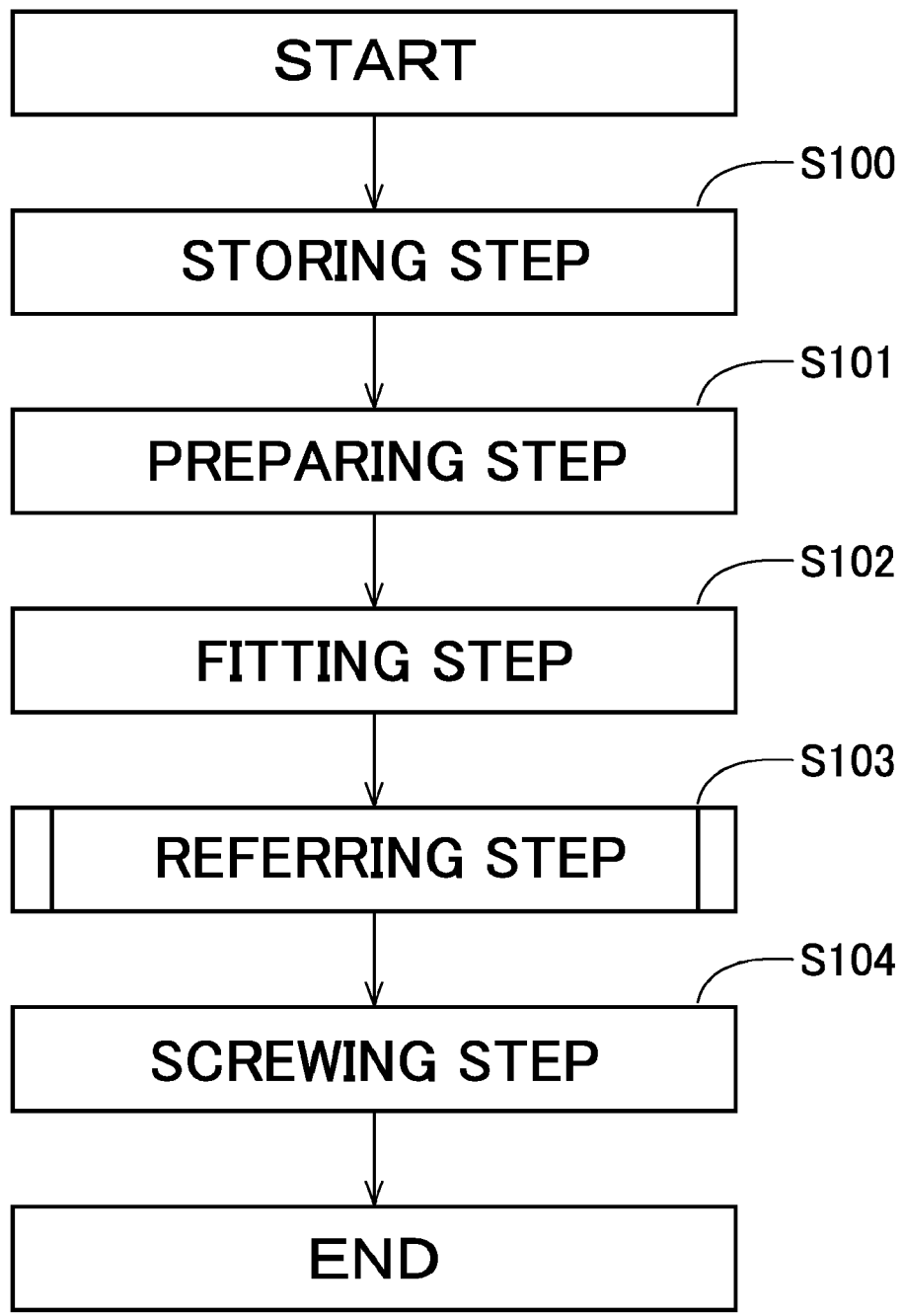
FIG. 5 is a flowchart illustrating a flow of a process of fitting the rotor hub and a clamper together according to the first preferred embodiment of the present invention.
Figure 6:
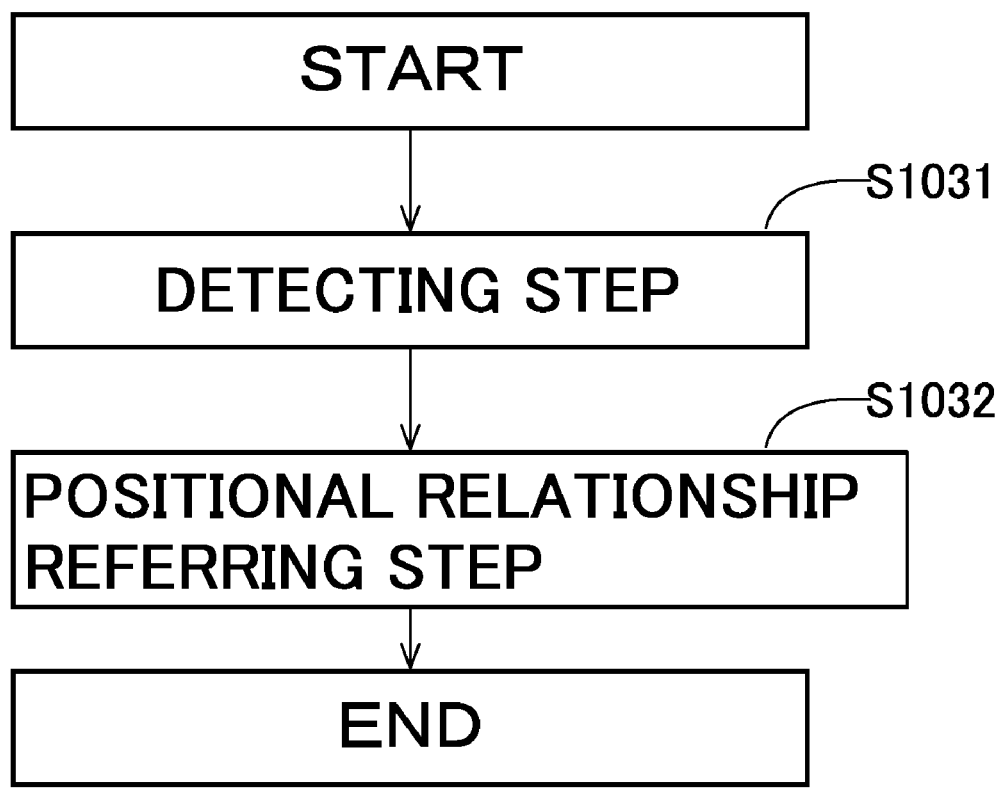
FIG. 6 is a flowchart illustrating a flow of a specific process in step S103 of FIG. 5.
Figure 7:
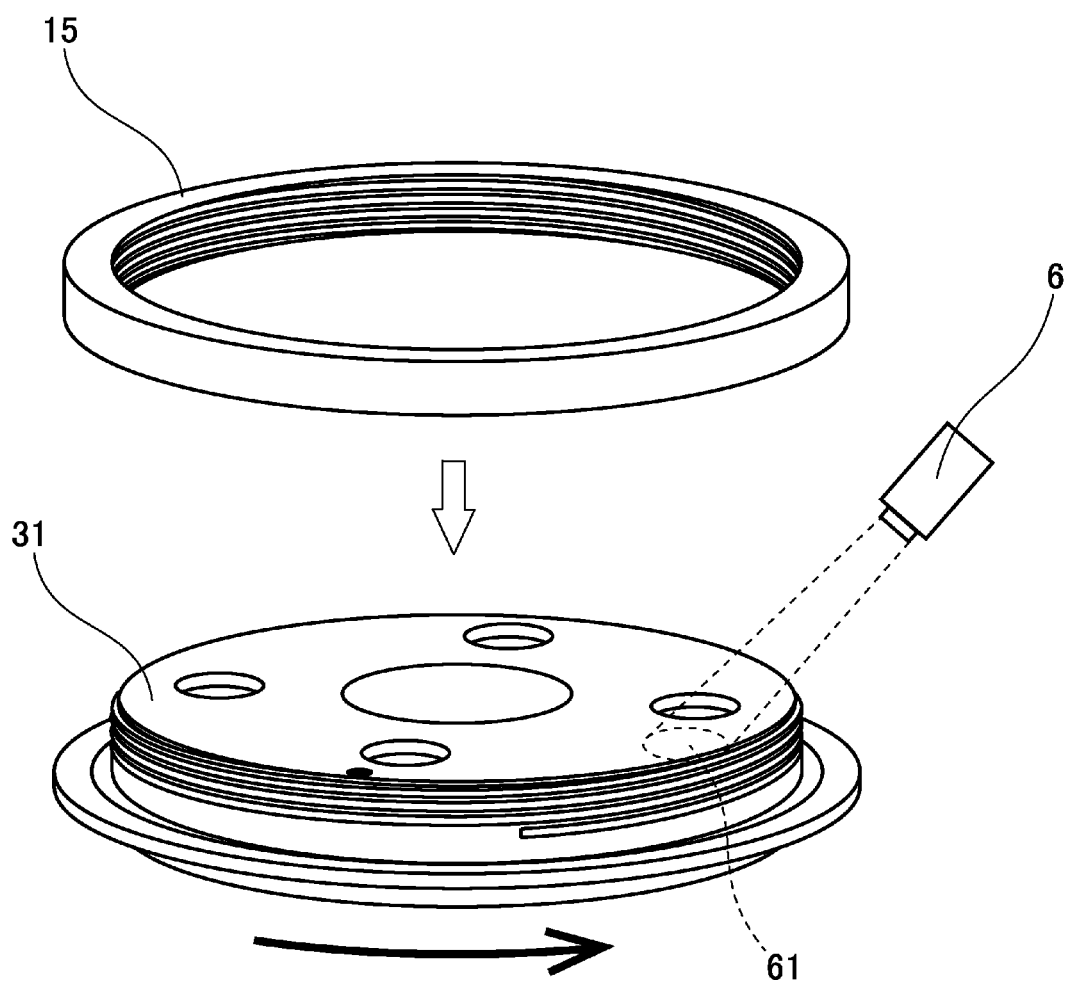
FIG. 7 is a perspective view illustrating how a spindle motor and the clamper are fitted together according to the first preferred embodiment of the present invention.

Next, a procedure for fitting the clamper 15 and the spindle motor 11 including the rotor hub 31 together in a process of manufacturing the disk drive apparatus 1 in accordance with a preferred embodiment of the present invention will now be described below. FIG. 5 is a flowchart illustrating a flow of a process of fitting the spindle motor 11 and the clamper 15 together. FIG. 6 is a flowchart illustrating a flow of a specific process in step S103 in FIG. 5. FIG. 7 is a perspective view illustrating how the spindle motor 11 and the clamper 15 are fitted together. In FIG. 7, the disk 14 and portions of the spindle motor 11 other than the rotor hub 31 are not shown.

Referring to FIG. 5, first, information regarding a positional relationship between the screw groove start position 512 and the hub information mark 53 is stored in a storage medium (step S100). Specifically, information regarding an angle by which the screw groove start position 512 is circumferentially displaced from the hub information mark 53 is stored in the storage medium. In the present preferred embodiment, the screw groove start position 512 and the hub information mark 53 are preferably radially overlapping. Therefore, information that the screw groove start position 512 is circumferentially displaced from the hub information mark 53 by zero degrees is preferably stored in the storage medium.

Next, the spindle motor 11, which includes the rotor hub 31 including the hub information mark 53, and the clamper 15, which includes the clamper screw grooves in the inner circumferential portion thereof, are prepared (step S101).

Then, the disk 14 is fitted to the rotor hub 31 of the spindle motor 11 (step S102). The disk 14 is thereby mounted on the disk mount portion 314 of the rotor hub 31.

Thereafter, the information regarding the relationship between the screw groove start position 512 and the hub information mark 53 is referred to (step S103). Specifically, referring to FIG. 6, the position of the hub information mark 53 is first detected through image processing (step S1031). Then, the information regarding the positional relationship between the screw groove start position 512 and the hub information mark 53 previously stored at step S100 is referred to (step S1032). It is possible to identify the screw groove start position 512 based on the position of the hub information mark 53 and the information regarding the positional relationship referred to. Specifically, in the present preferred embodiment, it is found that the screw groove start position 512 is at a position circumferentially displaced from the hub information mark 53 by zero degrees, that is, at a position radially overlapping with the hub information mark 53.

An image processing apparatus 6 is preferably used in step S1031, as illustrated in FIG. 7. The image processing apparatus 6 acquires an image of a predetermined image processing area 61 on the outer surface of the rotor hub 31, and analyzes the image acquired. Circumferential rotation of the rotor hub 31 is controlled by a fixture (not shown), i.e., the jig, portions of which are inserted into the jig receiving holes 52. If the rotor hub 31 is caused to rotate, and the hub information mark 53 reaches a predetermined position in the image processing area 61, the image processing apparatus 6 transmits a stop signal, and the fixture stops rotation of the rotor hub 31. The position of the hub information mark 53 is thus detected.

As described above, in the present preferred embodiment, the hub information mark 53 is arranged radially outward of each jig receiving hole 52. Therefore, the image processing apparatus 6 is able to easily detect the hub information mark 53 even when the portions of the fixture have been inserted into the jig receiving holes 52.

Note that, although the image processing apparatus 6 preferably remains stationary and the rotor hub 31 is caused to rotate in step S1031 in the present preferred embodiment, this is not essential to the present invention. The image processing apparatus 6 may alternatively be moved in the circumferential direction while the rotor hub 31 preferably remains stationary if so desired.

Finally, circumferential positioning of each of the clamper 15 and the rotor hub 31 is carried out based on the position of the hub information mark 53 detected in step S1031 and the information referred to in step S1032. Specifically, each of the clamper 15 and the rotor hub 31 is circumferentially positioned such that the screw groove start position 512 and a lower start position of a corresponding one of the clamper screw grooves axially overlap with each other. Then, the clamper 15 is screwed to the rotor hub 31 of the spindle motor 11 (step S104).

As described above, according to the present preferred embodiment, the screw groove start position 512 is identified by detecting the position of the hub information mark 53. This enables screwing of the clamper 15 to the rotor hub 31 to be effectively and efficiently accomplished. Moreover, it is not necessary to bring the hub screw grooves into contact with the clamper screw grooves before the screwing in order to find positions where the hub screw grooves and the clamper screw grooves are engaged with each other. This contributes to reducing the generation of undesirable particles.

Note that, in the case where the positional relationship between the screw groove start position 512 and the hub information mark 53 is fixed, step S100 and step S1032 in step S103 may be omitted if so desired.

Figure 8:
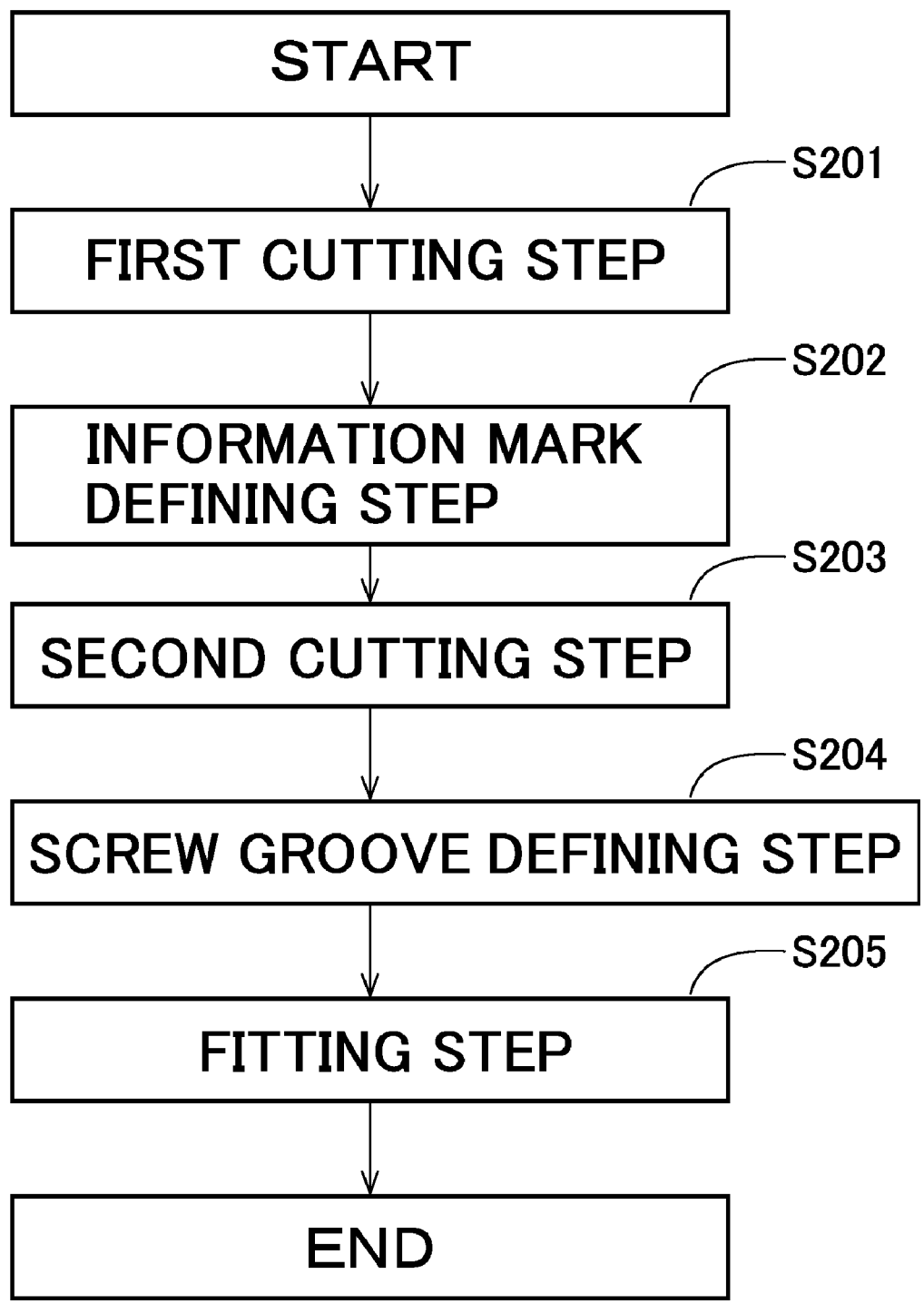
FIG. 8 is a flowchart illustrating a flow of a procedure for manufacturing a spindle motor according to a modification of the first preferred embodiment of the present invention.

Next, a procedure for manufacturing the spindle motor in accordance with a preferred embodiment of the present invention will now be described. FIG. 8 is a flowchart illustrating a flow of the procedure for manufacturing the spindle motor 11 in accordance with a preferred embodiment of the present invention.

In the procedure illustrated in FIG. 8, first, an intermediate workpiece is defined while an initial workpiece to be processed to become the rotor hub 31 is rotated about the central axis 9 (step S201). Here, the initial workpiece is preferably subjected to a first cutting process having a precision lower than that of a second cutting process performed at step S203, which will be described below.

Next, the hub information mark 53 is preferably defined in an outer surface of the intermediate workpiece (step S202). In the present preferred embodiment, the hub information mark 53 is defined in the upper surface of the hub circular plate portion 312 of the rotor hub 31 as described above.

In the present preferred embodiment, the hub information mark 53 is preferably defined by irradiating the outer surface of the intermediate workpiece with a laser beam.

Then, the intermediate workpiece is subjected to cutting to define the rotor hub 31 (step S203). Here, the intermediate workpiece is preferably subjected to the second cutting process having a precision higher than that of the first cutting process performed at the above-described step S201. The second cutting process is primarily performed on portions of the intermediate workpiece which are required to have highly precise shapes with respect to the central axis 9. More specifically, an upper surface portion of the intermediate workpiece, which is to become the hub circular plate portion 312, is subjected to cutting in the second cutting process. That is, the upper surface portion of the intermediate workpiece, in which the hub information mark 53 has been defined, is subjected to cutting in the second cutting process. However, the depth of cutting for the upper surface portion of the intermediate workpiece is preferably arranged to be smaller than the thickness of the hub information mark 53, which has been defined by irradiation of the laser beam. Therefore, the hub information mark 53 remains on the upper surface of the hub circular plate portion 312 of the rotor hub 31 after the second cutting process. Note that the entire outer surface of the intermediate workpiece may be subjected to cutting in the second cutting process. Also note that, in the second cutting process, another portion of the intermediate workpiece may be subjected to cutting without the upper surface portion of the intermediate workpiece in which the hub information mark 53 has been defined being subjected to cutting.

Thereafter, the hub screw grooves 511 are defined in the hub cylindrical portion 313 of the rotor hub 31 (step S204). In the present preferred embodiment, the hub screw grooves 511 are preferably defined by, for example, cutting. The hub screw grooves 511 are defined such that the screw groove start position 512 of one of the hub screw grooves 511 radially overlaps with the hub information mark 53 on the outer surface of the rotor hub 31.

Then, the rotating portion 3, which includes the rotor hub 31, and the stationary portion 2, which is arranged to be stationary with respect to the rotating portion 3, are fitted together (step S205). As a result, the spindle motor 11 is obtained.

Figure 9:
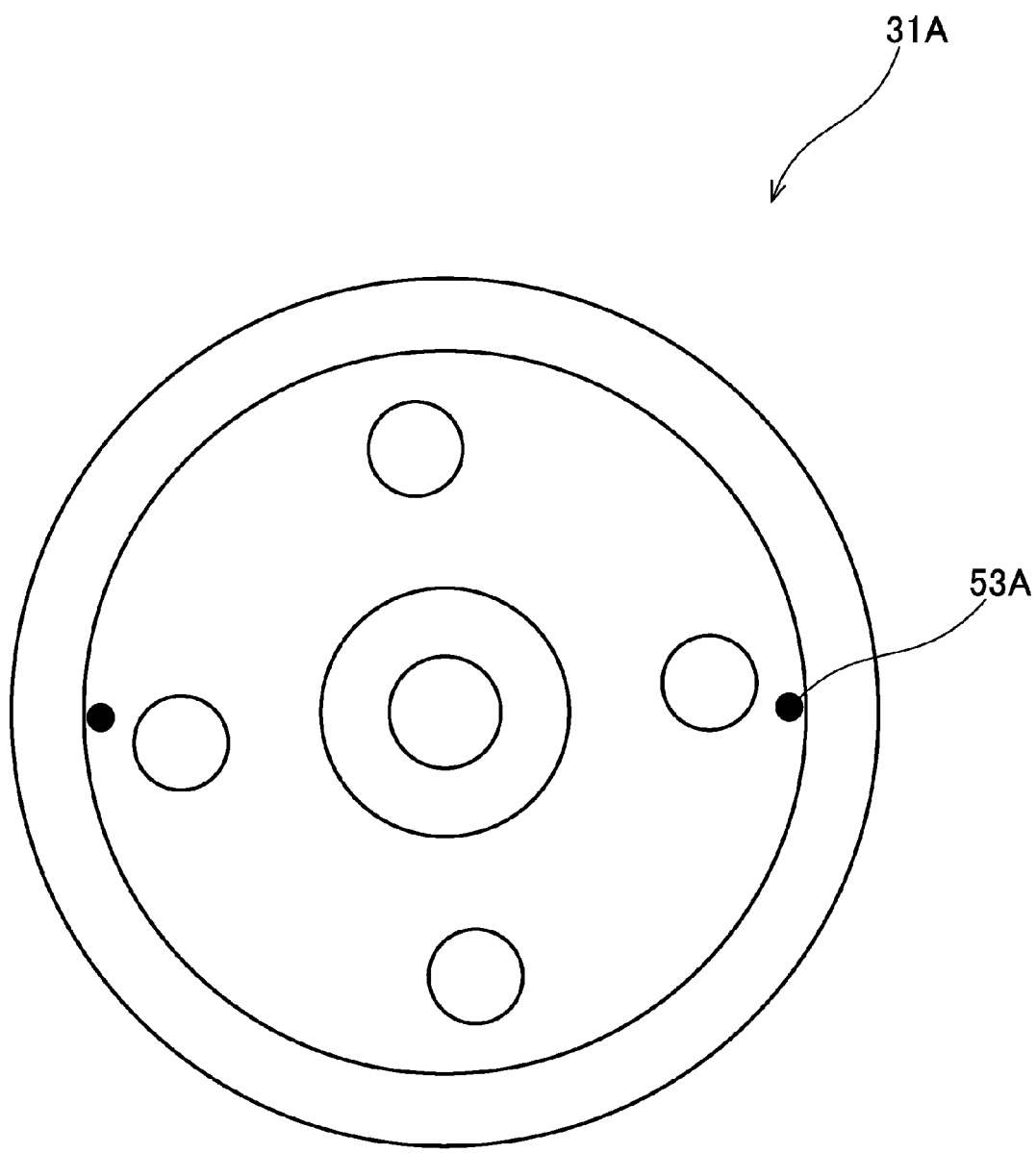
FIG. 9 is a top view of a rotor hub according to a modification of the first preferred embodiment of the present invention.

FIG. 9 is a top view of a rotor hub 31A according to a modification of the first preferred embodiment of the present invention. In the modification illustrated in FIG. 9, the rotor hub 31A preferably includes two hub information marks 53A and a hub screw portion of the rotor hub 31A is defined by a double-start thread. The rotor hub 31A therefore preferably includes two screw groove start positions.

Figure 10:
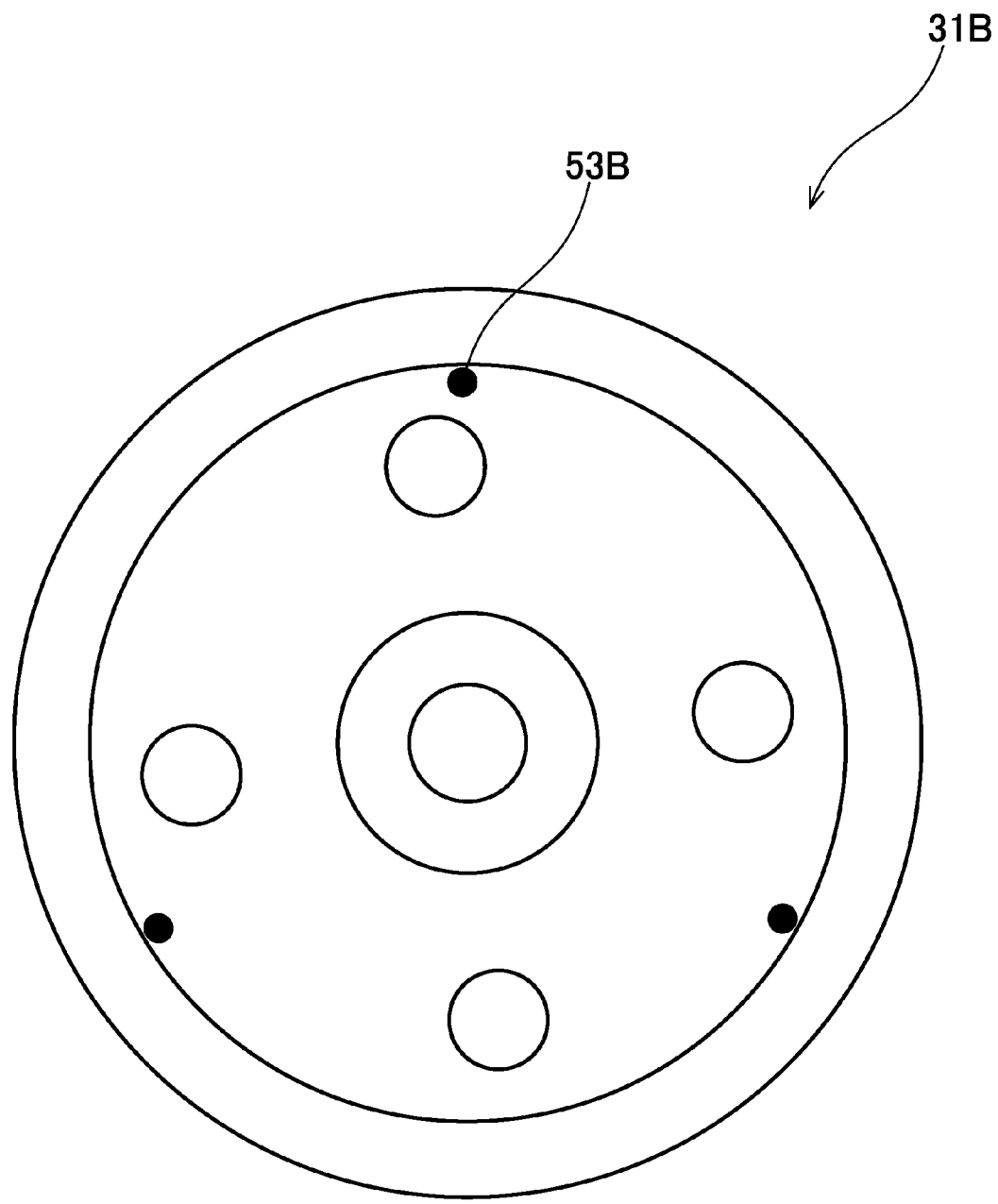
FIG. 10 is a top view of a rotor hub according to a modification of the first preferred embodiment of the present invention.

FIG. 10 is a top view of a rotor hub 31B according to another modification of the first preferred embodiment. In the modification illustrated in FIG. 10, the rotor hub 31B preferably includes three hub information marks 53B and a hub screw portion of the rotor hub 31B is defined by a triple-start thread. The rotor hub 31B therefore preferably includes three screw groove start positions.

In the modifications illustrated in FIGS. 9 and 10, respectively, a plurality of hub information marks are preferably provided. In addition, the hub screw portion of the rotor hub is defined by a multi-start thread and the number of hub information marks defined in the rotor hub is equal to the number of threads included in the hub screw portion. That is, the number of hub information marks is equal to the number of screw groove start positions. The number of hub information marks is thereby increased. An increase in the number of hub information marks contributes to reducing the amount of movement of the rotor hub or the image processing apparatus when detection of the hub information marks is carried out.

Figure 11:
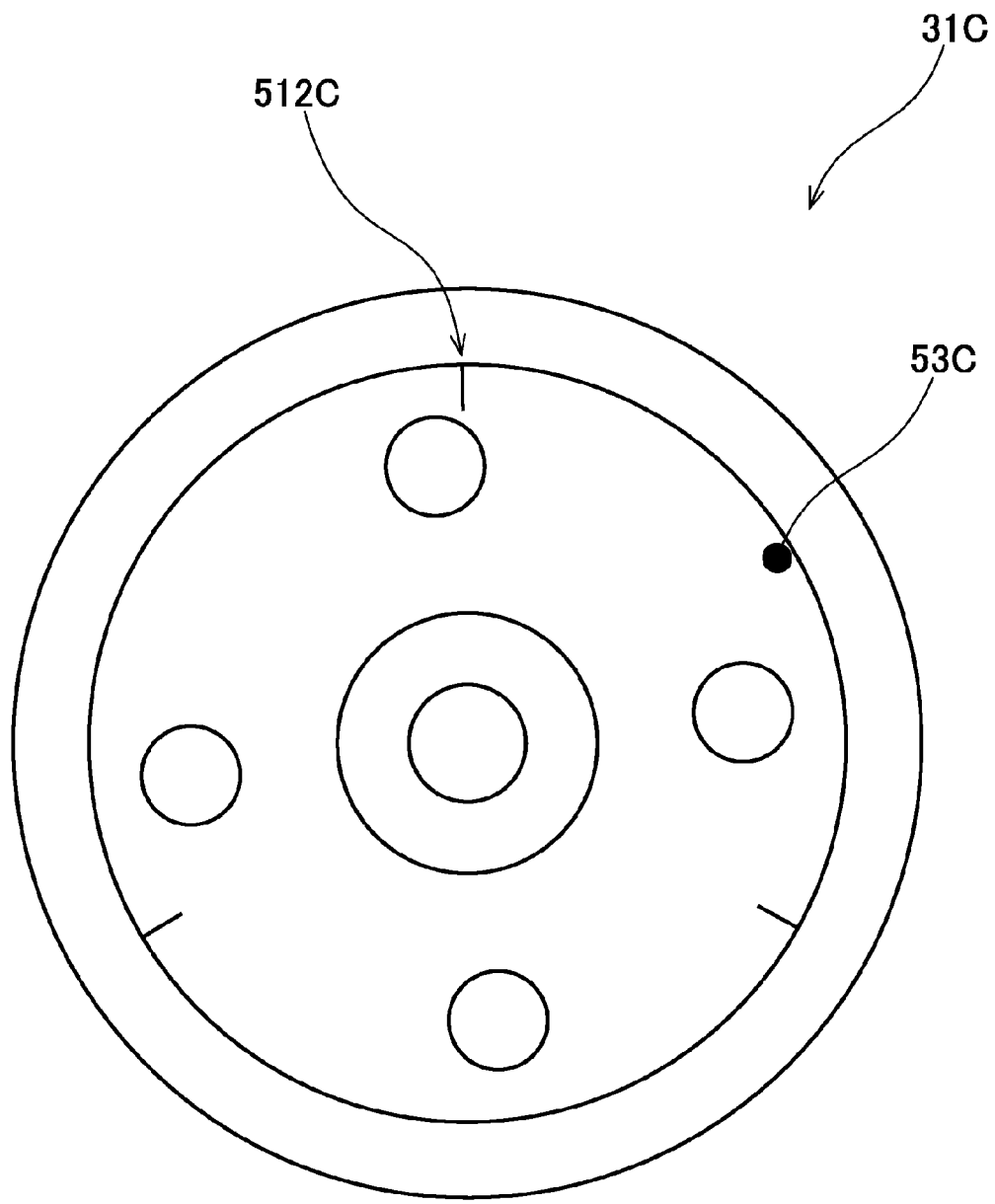
FIG. 11 is a top view of a rotor hub according to a modification of the first preferred embodiment of the present invention.

FIG. 11 is a top view of a rotor hub 31C according to another modification of the first preferred embodiment. In the modification illustrated in FIG. 11, the rotor hub 31C preferably includes three screw groove start positions 512C and one hub information mark 53C. The hub information mark 53C does not radially overlap with any of the screw groove start positions 512C. In the modification illustrated in FIG. 11, on an outer surface of the rotor hub 31C, the hub information mark 53C is at a position circumferentially displaced from each screw groove start position 512C by a predetermined angle. Specifically, the screw groove start positions 512C are preferably arranged at positions circumferentially displaced from the hub information mark 53C by about 60 degrees, about 180 degrees, and about 300 degrees, respectively, in a plan view, for example.

In the case where the hub information mark 53C is circumferentially displaced from each screw groove start position 512C by a predetermined angle as described above, information that the hub information mark 53C is circumferentially displaced from each screw groove start position 512C by the predetermined angle is stored in the above-described step S100. In the modification illustrated in FIG. 11, information that one of the screw groove start positions 512C is circumferentially displaced from the hub information mark 53C by about 60 degrees, for example, is stored. Then, in the above-described step S1032 in step S103, the information regarding the circumferential displacement between the screw groove start position 512C and the hub information mark 53C stored previously at step S100 is referred to.

Note that, although the hub information mark preferably is defined in the vicinity of a radially outer end portion of the upper surface of the hub circular plate portion in the above-described preferred embodiments and modifications thereof, this is not essential to the present invention. For example, the hub information mark may be arranged more radially inward than in the above-described preferred embodiment. Also, a portion of the hub information mark may be arranged at the radially outer end portion of the upper surface of the hub circular plate portion. The hub information mark is thus arranged as far radially outward as possible. The start position of each hub screw groove can be identified more accurately as the hub information mark is arranged more radially outward.

Also note that, although the hub information mark is defined in the upper surface of the hub circular plate portion of the rotor hub in the above-described preferred embodiments and modifications thereof, this is not essential to the present invention. Instead, the hub information mark may alternatively be defined at any other appropriate position on the outer surface of the rotor hub, such as on an outer surface of one of the hub screw grooves, for example.

Also note that, although the hub information mark is preferably defined by irradiating the outer surface of the rotor hub with the laser beam in the above-described preferred embodiments and modifications thereof, this is not essential to the present invention. For example, the hub information mark may alternatively be defined by attaching a marker to the outer surface of the rotor hub. In this case, the hub information mark is preferably defined by use of a pen, but attachment of the hub information mark may be accomplished by use of a seal, an ink jet, or by any other desirable method. In the case where the marker is attached to the outer surface of the rotor hub, the upper surface portion of the intermediate workpiece, which is to become the hub circular plate portion, is preferably not subjected to cutting in the second cutting process. The upper surface portion on which the hub information mark has been defined is thus not subjected to cutting in the second cutting process.

Also note that, although the step of defining the hub information mark is preferably performed after the step of the first cutting process for the rotor hub and before the step of the second cutting process in the above-described preferred embodiments and modifications thereof, this is not essential to the present invention. The step of defining the hub information mark may alternatively be performed after both the first and second cutting processes for the rotor hub.

Also note that, although both the step of defining the hub screw grooves and the step of fitting the stationary and rotating portions together are preferably performed after the step of defining the hub information mark in the procedure for manufacturing the spindle motor according to the above-described preferred embodiments and modifications thereof, this is not essential to the present invention.

Figure 12:
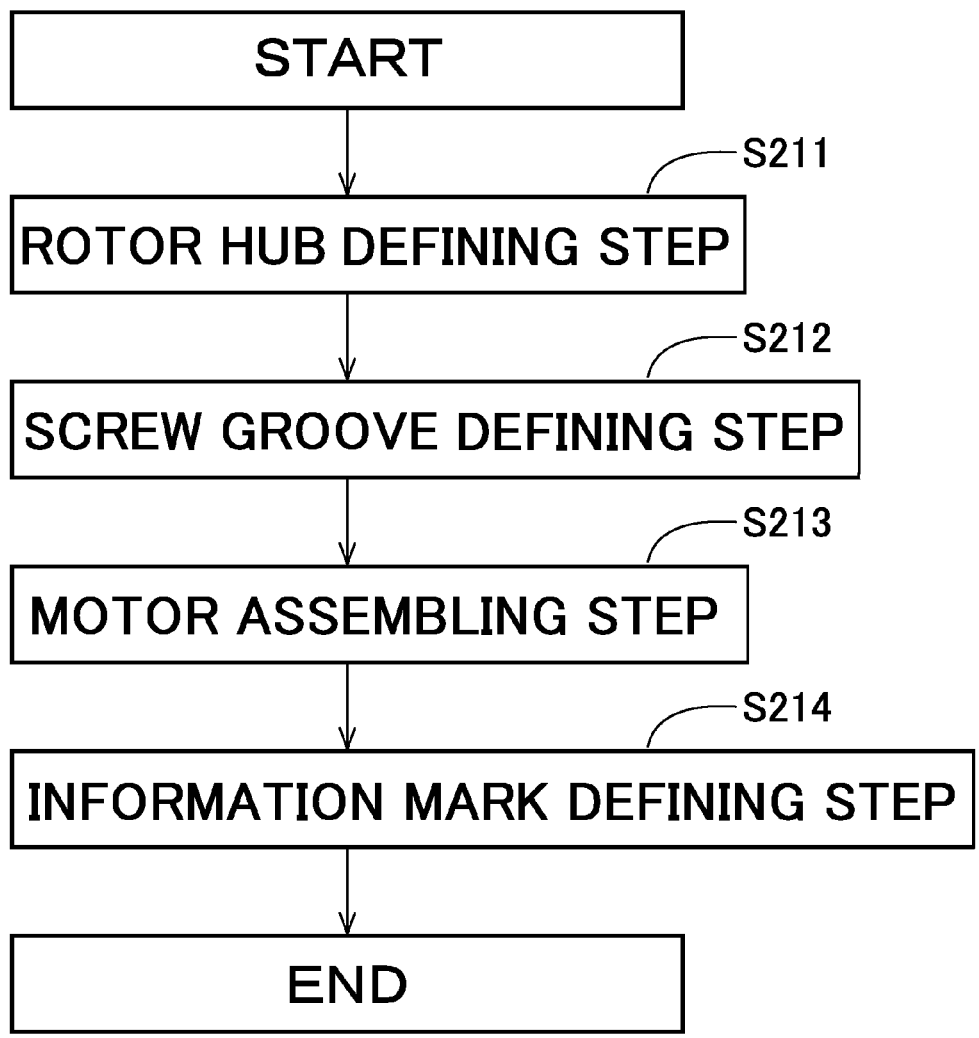
FIG. 12 is a flowchart illustrating a flow of a procedure for manufacturing a spindle motor according to a modification of the first preferred embodiment of the present invention.

FIG. 12 is a flowchart illustrating a flow of a procedure for manufacturing a spindle motor according to a modification of the first preferred embodiment.

In the procedure illustrated in FIG. 12, first, an initial workpiece which is to be processed is subjected to cutting while being rotated about a central axis to define a rotor hub (step S211). Next, a hub screw groove is defined in an outer surface of the rotor hub by cutting (step S212). That is, step S212 is a screw groove defining step. Thereafter, a rotating portion including the rotor hub and a stationary portion, which is arranged to be stationary with respect to the rotating portion, are fitted together (step S213). Then, a hub information mark is defined at a start position of the hub screw groove or at a position circumferentially displaced from the start position by a predetermined angle on the outer surface of the rotor hub (step S214).

As in the procedure of the modification of a preferred embodiment of the present invention illustrated in FIG. 12, the step of defining the hub information mark may be performed after the step of defining the hub screw groove, and the step of defining the hub information mark may be performed after the step of fitting the stationary and rotating portions together.

The spindle motor according to the above-described preferred embodiments and modifications thereof is preferably a motor of a so-called fixed-shaft type in which the shaft belongs to the stationary portion. Note, however, that a spindle motor according to a preferred embodiment of the present invention may alternatively be a motor of a so-called rotating-shaft type in which the shaft belongs to the rotating portion.

The spindle motor according to the above-described preferred embodiments and modifications thereof is preferably a so-called outer-rotor motor in which the magnet is arranged to rotate radially outside the stator. Note, however, that a spindle motor according to a preferred embodiment of the present invention may alternatively be a so-called inner-rotor motor in which the magnet is arranged to rotate radially inside the stator.

Also note that the detailed shape of any member may be different from the shape thereof as illustrated in the accompanying drawings of the present application. Also note that features of the above-described preferred embodiments and the modifications thereof may be combined appropriately as long as no conflict arises.

The preferred embodiments of the present invention and the modifications thereof are applicable to a method of manufacturing a disk drive apparatus and a method of manufacturing a spindle motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a disk drive apparatus, the method comprising the steps of:
preparing a spindle motor including a rotor hub including an outer surface with a hub screw groove and a hub information mark indicative of a start position of the hub screw groove, and the rotor hub being arranged to rotate about a central axis;
preparing a clamper including a clamper screw groove in an inner circumferential portion thereof;
fitting a recording disk to the spindle motor;
detecting a position of the hub information mark; and
based on the detected position of the hub information mark, positioning each of the clamper and the spindle motor in a circumferential direction, and screwing the clamper to the spindle motor.

2. The method of manufacturing the disk drive apparatus according to claim 1, wherein, on the outer surface of the rotor hub, the hub information mark and the start position of the hub screw groove are arranged to overlap with each other in a radial direction with respect to the central axis.

3. The method of manufacturing the disk drive apparatus according to claim 1, wherein, on the outer surface of the rotor hub, the hub information mark is arranged at a position circumferentially displaced from the start position of the hub screw groove by a predetermined angle.

4. The method of manufacturing the disk drive apparatus according to claim 1, wherein the hub information mark is defined by shaving the outer surface of the rotor hub.

5. The method of manufacturing the disk drive apparatus according to claim 4, wherein the hub information mark is defined by a method including irradiation with a laser beam or cutting.

6. The method of manufacturing the disk drive apparatus according to claim 1, wherein the hub information mark is defined by attaching a marker to the outer surface of the rotor hub.

7. The method of manufacturing the disk drive apparatus according to claim 6, wherein the hub information mark is defined by a method including use of a seal, use of an ink jet, or use of a pen.

8. The method of manufacturing the disk drive apparatus according to claim 1, wherein the rotor hub includes:
- a hub circular plate portion arranged to extend radially with respect to the central axis;
- a hub cylindrical portion arranged to extend axially downward from an outer circumferential portion of the hub circular plate portion; and
- a disk mount portion arranged to extend radially outward from the hub cylindrical portion; and the hub information mark is defined in an upper surface of the hub circular plate portion.

9. The method of manufacturing the disk drive apparatus according to claim 8, wherein at least a portion of the hub information mark is arranged at a radially outer end portion of the upper surface of the hub circular plate portion.

10. The method of manufacturing the disk drive apparatus according to claim 8, wherein the hub circular plate portion includes a jig receiving hole arranged to be recessed downward from the upper surface thereof; and the hub information mark is arranged radially outward of the jig receiving hole.

11. The method of manufacturing the disk drive apparatus according to claim 1, wherein the step of detecting the position of the hub information mark is performed through image processing.

12. The method of manufacturing the disk drive apparatus according to claim 1, wherein a number of hub information marks included in the rotor hub is one or more than one.

13. The method of manufacturing the disk drive apparatus according to claim 1, wherein the rotor hub includes a hub screw portion defined by a multi-start thread; and a number of hub information marks included in the rotor hub is equal to a number of threads included in the hub screw portion.

* * * * *